Dec. 18, 1962  D. A. BURT ET AL  3,069,558
FREQUENCY SENSITIVE CONTROL CIRCUIT
Filed Aug. 12, 1957
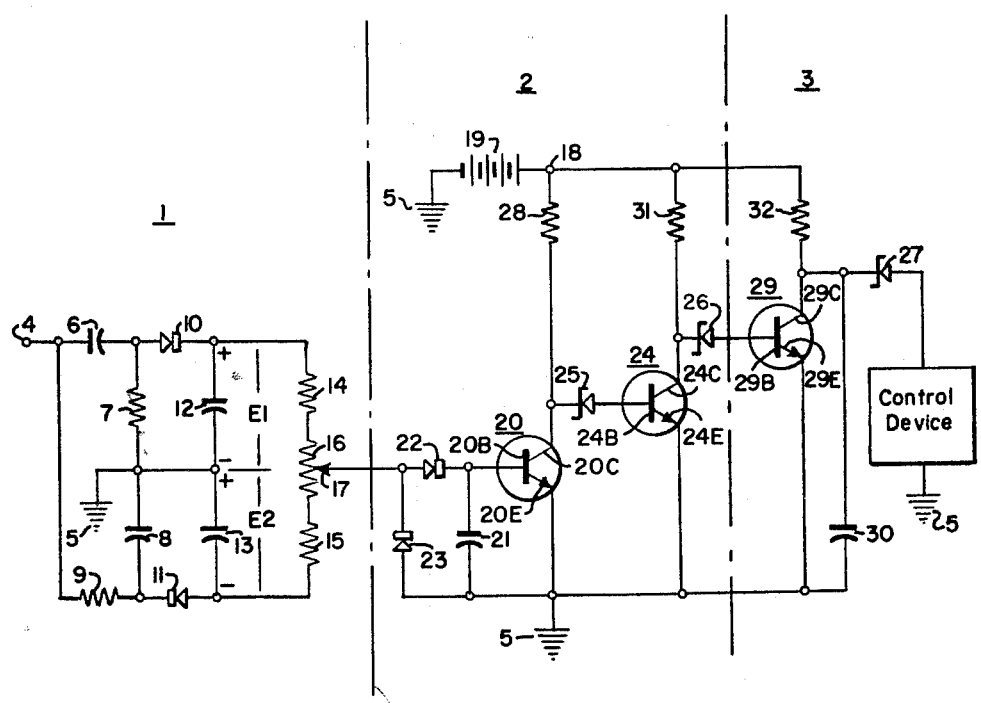
WITNESSES:
Bernard R. Gieguey
Ernest P. Klipfel
INVENTORS
Donald A. Burt and
Clyde A. Booker, Jr.
BY
ATTORNEY

3,069,558
FREQUENCY SENSITIVE CONTROL CIRCUIT
Donald A. Burt, Franklin Township, Westmoreland County, and Clyde A. Booker, Jr., Churchill, Pa., assignors to Westinghouse Electric Corporation, East Pittsburgh, Pa., a corporation of Pennsylvania
Filed Aug. 12, 1957, Ser. No. 677,678
1 Claim. (Cl. 307—88.5)

Our invention relates to a frequency sensitive control circuit and, more particularly, to a control circuit for actuating a control device when the frequency of an alternating current line varies below a predetermined value.

Although this circuit need not be restricted to any specific application, it finds particularly important use in alternating current power systems used in aircraft. In many such systems, a means is required for sensing the frequency of an alternating current generator output voltage since a drop of frequency below a certain level, herein referred to as the allowable underfrequency point, would be harmful to the connected load of the system. Particularly in aircraft applications, such a control system must have a very high degree of reliability and surety of operation and require as little maintenance as possible. Size and weight must be kept at a minimum without detracting from reliability. This problem is more acute because of the severity of environmental conditions encountered in aircraft systems, such as mechanical shock, vibration, and wide range of temperature ambients.

The prime object of our invention is to supply a new and improved circuit with an output function responsive to frequency variations.

A more particular object is to supply a new and improved circuit responsive to frequency variations delivering an output signal upon sensing a drop in frequency below an allowable underfrequency point.

Another object of this invention is to supply a frequency sensitive control circuit which will be compact, light in weight, and reliable through the use of static devices requiring little or no maintenance.

Another object is to supply a frequency sensitive control circuit capable of satisfactory operation over a wide temperature range and other adverse environmental conditions encountered in aircraft applications, such as mechanical shock and vibration.

Another object is to supply a frequency sensitive control circuit with highly accurate response to extremely small frequency variations while being substantially unaffected by variations in the supply voltage.

A further object is to supply a frequency sensitive control circuit providing an output signal after a predetermined time delay thereby preventing operation under transient conditions.

The invention will be more fully understood from the following detailed description, taken in connection with the accompanying drawing, in which the sole FIGURE is a schematic diagram of an illustrative embodiment of the invention.

In the illustrative embodiment shown in the drawing, the circuit is shown as including three parts: a sensing circuit 1, amplifier 2, and a time delay circuit 3. The sensing circuit 1 consists of filtering means, and provides an output signal which changes in polarity to indicate a frequency over or under a predetermined value herein referred to as the allowable underfrequency point. This output signal is preferably amplified by the amplifier 2 and controls the time delay circuit 3 from which a final output voltage is derived for operation of a control device or any other desired purpose.

The sensing circuit 1 is shown connected to respond to the frequency of an alternating-current line 4 and is shown as being connected between the line 4 and ground 5 to be energized thereby. The sensing circuit 1 consists of two frequency-responsive filter circuits connected in parallel between the line 4 and ground 5. One filter circuit consists of capacitor 6 and resistor 7 selected to form a high-pass filter, while the other filter circuit consists of capacitor 8 and resistor 9 selected to form a low-pass filter. These filter components are adjusted so that at the allowable frequency point selected, the magnitude of the output voltage from each filter is about one-half of the input voltage. The output voltages of the filters are rectified by the rectifiers 10 and 11, and the alternating-current ripple is removed by capacitors 12 and 13. The rectifiers are connected so that the direct-current output voltages E1 and E2, from the filters, have polarities as shown in the figure. Resistors 14 and 15, of equivalent ohmic value, are connected in series with a potentiometer 16 across the output voltages E1 and E2. It will be apparent that when the voltages E1 and E2 are equal, the voltage at the midpoint of the potentiometer 16 will be at ground potential. An adjustable tap 17 is provided to compensate for variations in the manufacturing tolerances of the components of the filter circuits and is set at the ground potential point of the potentiometer 16 for the desired allowable underfrequency point. In other words, at the selected allowable underfrequency point, there will be zero potential between the potentiometer tap 17 and ground 5.

With the sensing circuit 1 preset as indicated, a frequency on the alternating-current line 4 equal to the allowable underfrequency point will result in zero potential between potentiometer tap 17 and ground 5. If the frequency on the alternating-current line 4 increases above the allowable underfrequency point, the direct-current output voltage E1 increases and the direct-current output voltage E2 decreases, so that the potentiometer tap 17 becomes positive with respect to ground 5. On the other hand, if the frequency on the alternating-current line 4 decreases below the allowable underfrequency point, the direct-current output voltage E1 will decrease and the direct-current output voltage E2 will increase, resulting in the potentiometer tap 17 becoming negative with respect to ground 5.

From the foregoing, it will be seen that a signal voltage appears at the potentiometer tap 17 which is positive with respect to ground 5 when the frequency being measured is above the allowable underfrequency point and is conversely negative with respect to ground 5 when the frequency is below the allowable underfrequency point.

This change to negative polarity of the output signal of the filter circuit 1 when the frequency drops below the allowable underfrequency point is utilized to obtain a final output voltage for the operation of a control device or any other desired purpose.

The signal voltage of the frequency sensing circuit 1 is preferably amplified by means of an amplifier circuit 2 which is herein shown as a two-stage transistor amplifier, although any suitable type of amplifier circuit may be utilized. The preferred amplifier circuit is shown in the drawing using two junction type transistors. With NPN transistors, as used in our illustrative embodiment, the transistors will become saturated when a positive bias of sufficient magnitude is applied to the base electrodes with respect to the emitter electrodes thereby simulating a switch in the closed position. Conversely, if the bases of the NPN transistors are biased negatively or if there is no base potential with respect to their emitters, the transistors will be "cut-off" or non-conductive, thereby simulating a switch in the open position.

The amplifier circuit 2 uses transistors 20 and 24 in a Zener diode coupled circuit. It will be understood that a Zener diode is a semi-conductor rectifier, usually a silicon diode, which has the characteristic of blocking current flow in one direction when the voltage is below a predetermined breakdown value while current is permitted to flow freely when the voltage is above a predetermined value. The breakdown is non-destructive so that the current is cut-off when the voltage again drops below the breakdown value. Of course, any device with a breakdown region as described can be used.

A constant direct-current potential, shown connected between the direct-current line 18 and ground 5, illustrated as a battery 19, is impressed upon the amplifier 2 and time delay circuit 3, providing the necessary driving potential for all the transistors and the time delay circuit 3. Of course, any suitable source such as a direct-current bus as used in aircraft can be used.

As indicated in the drawing, potentiometer tap 17 is connected to the base electrode 20B of the transistor 20 through a rectifier 22 so that current can flow to the base of the transistor when the voltage at the tap 17 is positive with respect to ground 5. An oppositely connected rectifier 23 provides a current path when the voltage at tap 17 is negative with respect to ground 5. A filter capacitor 21 is preferably provided to reduce the ripple of current flow into the base electrode 20B of the transistor 20.

The collector electrode 20C is connected to the direct-current supply 19 through a resistor 28 and the emitter electrode 20E is connected to ground 5. In the same manner transistors 24 and 29 have their collector electrodes 24C and 29C, respectively, connected to the direct-current supply 19 through resistors 31 and 32, respectively, while their emitter electrodes 24E and 29E, respectively, are connected to ground 5. It will be seen that when base current flows into the transistor 20 so that there is a positive bias on the transistor 20, it becomes conductive and simulates a switch in the closed position, effectively shorting out the Zener diode 25 and transistor 24. As a result, the transistor 24 functions as a switch in the open position thereby putting sufficient voltage across Zener diode 26 to cause conduction of current into the transistor 29. Being positively biased, transistor 29 acts as a closed switch, effectively grounding Zener diode 27 so that no breakdown of that diode occurs and therefore no final output signal is impressed upon the control device.

However, when potentiometer tap 17 is negative with respect to ground 5, because the frequency being measured is below the allowable underrequency point, a negative bias is impressed upon base electrode 20B causing non-conduction of transistor 20 and breakdown of Zener diode 25, thereby causing transistor 24 to conduct. Conduction of transistor 24 effectively shorts the Zener diode 26 and base electrode 29B so that transistor 29 is non-conductive or in the "open" position. Thus, capacitor 30 connected across collector electrode 29C and ground 5 builds up a charge through the resistor 32. This charge increases exponentially at a rate determined by the values of the resistor 32 and capacitor 30 until the breakdown voltage of Zener diode 27 is exceeded, giving an output signal voltage to the control device. The length of time delay obtained is influenced by the values of the resistor 32, capacitor 30, and Zener diode 27 as well as the magnitude of the direct-current supply voltage.

It is now clear that a frequency on the alternating-current line 4 above the allowable underfrequency point results in a positive potential on the potentiometer tap 17 causing transistor 29 to be conductive thereby shorting out capacitor 30 so no final output voltage is impressed on the control device. With a measured frequency below the allowable underfrequency point, an opposite polarity occurs on the potentiometer tap 17 so that capacitor 30 is charged exponentially to a value sufficient to cause an output voltage to the control device. Because of the finite gain of the circuit, there is a small frequency difference between cut-off and saturation of the transistors employed.

Since the sensing circuit 1 derives a signal output through a comparison of the magnitudes of two voltages, namely E1 and E2 taken from the high and low pass filters connected directly to the line, our invention is unaffected by fluctuations in line voltage while remaining very sensitive to small changes of frequency. Static components have been used providing a rugged compact package suitable for aircraft use or similar severe environmental applications.

It is to be understood that our invention can be modified to obtain other desired types of response with a change in frequency. Interchanging of the high and low-pass filters will allow this same circuit to operate as an overfrequency circuit. The effective allowable frequency point can be adjusted by the potentiometer employed in the circuit. Changing of the circuit parameters to different values will allow this same circuit to be used for entirely different frequency ranges. A circuit can be evolved to operate as an off-frequency circuit which would furnish an output voltage if the frequency being measured should drift above or below a tolerable reference frequency range. The signal voltage of the frequency sensing circuit 1 could be fed directly into the transistor 29 triggering the time delay circuit 3, thereby omitting the amplifier 2 if a signal of sufficient magnitude to control the transistor 29 is derived from the sensing circuit.

Various other modifications are also possible within the scope of our invention. Static control means capable of interrupting the alternating-current generator voltage at the frequency source, or of performing any other desired function, can be employed as the final control device, although any suitable type of control device might be used. Transistors of the NPN type have been shown, but it will be obvious that PNP transistors may also be used with suitable changes in polarity.

Although a particular embodiment of the invention has been shown for the purpose of illustration, it is to be understood that the invention is not limited to the specific arrangement shown, but includes all equivalent embodiments and modifications.

We claim as our invention:

A frequency responsive control circuit for responding to the frequency of an alternating current power circuit, said control circuit comprising frequency sensing means adapted to provide a direct current output of one polarity when the frequency of said power circuit is above a predetermined value and of opposite polarity when the frequency of the power circuit is below said value, transistor amplifier means energized by the direct current output of the frequency sensitive means, said amplifier means having an output only when said direct current output is of predetermined polarity, and time delay means including a capacitor, means for charging the capacitor, voltage responsive means for providing a continuous output signal when the capacitor voltage exceeds a predetermined value, and transistor means controlled by the output of the amplifier means for preventing charging of the capacitor when an output is present from the amplifier means and for permitting the capacitor to charge in the absence of an output from the amplifier means.

References Cited in the file of this patent

UNITED STATES PATENTS

| | | |
|---|---|---|
| 2,686,877 | Lawson | Aug. 17, 1954 |
| 2,699,499 | Jordan | Jan. 11, 1955 |
| 2,712,600 | Beckwith | July 5, 1955 |
| 2,739,273 | Andrews | Mar. 20, 1956 |
| 2,756,336 | Christensen | July 24, 1956 |
| 2,773,181 | Singel | Dec. 4, 1956 |
| 2,780,724 | Fickett | Feb. 5, 1957 |
| 2,781,478 | Cooke | Feb. 12, 1957 |
| 2,817,755 | Koch | Dec. 24, 1957 |
| 2,834,879 | Bauman | May 13, 1958 |
| 2,839,684 | Smith-Vaniz | June 17, 1958 |
| 2,849,626 | Klapp | Aug. 26, 1958 |
| 2,879,456 | Pinckaers | Mar. 24, 1959 |
| 2,892,102 | Reuther et al. | June 23, 1959 |
| 2,898,557 | Dahlin | Aug. 4, 1959 |